United States Patent [19]
Rej et al.

[11] Patent Number: 5,942,156
[45] Date of Patent: Aug. 24, 1999

[54] NEUTRON CAPTURE INDUCED RADIATION TREATMENT OF POLYMER MATERIALS

[75] Inventors: Donald J. Rej; Debra A. Wrobleski, both of Los Alamos, N.Mex.

[73] Assignee: The Regents of the University of California, Los Alamos, N.Mex.

[21] Appl. No.: 08/806,894

[22] Filed: Feb. 25, 1997

Related U.S. Application Data

[60] Provisional application No. 60/012,298, Feb. 26, 1996.

[51] Int. Cl.$^6$ .............................. A62D 31/00; G03C 1/00
[52] U.S. Cl. .......................................... 252/478; 252/600
[58] Field of Search .................................... 252/478, 500, 252/600; 427/523, 595, 496

[56] References Cited

U.S. PATENT DOCUMENTS

| | | | |
|---|---|---|---|
| 4,134,937 | 1/1979 | Cass et al. | 260/862 |
| 4,176,093 | 11/1979 | Zoch | 252/478 |
| 4,198,322 | 4/1980 | Storm | 252/478 |
| 4,622,355 | 11/1986 | Arnold et al. | 524/89 |
| 5,094,876 | 3/1992 | Goldberg et al. | 427/2 |
| 5,130,161 | 7/1992 | Mansur et al. | 427/38 |
| 5,262,463 | 11/1993 | Berzen | 524/404 |
| 5,354,584 | 10/1994 | Schmidt | 427/530 |
| 5,407,992 | 4/1995 | Lee et al. | 427/523 |
| 5,672,465 | 9/1997 | Patel et al. | 430/332 |

OTHER PUBLICATIONS

L. Calcagno et al. "Structural Modification of Polymer Films by Ion Irradiation", Nuclear Instruments and Methods in Physics Research B65,(1992), pp. 413–422.

*Primary Examiner*—Philip Tucker
*Attorney, Agent, or Firm*—Bruce H. Cottrell

[57] ABSTRACT

A precursor composition adapted for neutron capture induced radiation treatment of said precursor composition including a polymer matrix containing dispersed dopant material, the dispersed dopant material characterized as capable of neutron capture whereupon subsequent in situ energetic ion irradiation of the polymer matrix can occur, and further characterized as dispersed so as to provide dopant domain sizes significantly less than the energetic ion range of the dopant material is provided. Also provided is a process of in situ irradiation of bulk polymeric articles by first providing a precursor composition adapted for neutron capture induced radiation treatment of the precursor composition including a polymer matrix containing dispersed dopant material, the dispersed dopant material characterized as dispersed so as to provide dopant domain sizes significantly less than the energetic ion range of the dopant material, and then exposing the precursor composition to a source of neutrons.

7 Claims, 2 Drawing Sheets

Neutron Beam — Boron-doped Polymer Target

NEUTRON CAPTURE INDUCED RADIATION TREATMENT OF POLYMER MATERIALS

This application claims priority from provisional application serial No. 60/012,298 filed on Feb. 26, 1996.

FIELD OF THE INVENTION

The present invention relates to radiation treatment of polymer materials and more particularly to the neutron capture induced radiation treatment of polymer materials. This invention is the result of a contract with the Department of Energy (Contract No. W-7405-ENG-36).

BACKGROUND OF THE INVENTION

Polymers are useful materials because of their ease of fabrication, moldability, light weight, chemical inertness, and low cost. Additional structural applications are limited since polymers are inherently soft materials with relatively low mechanical strength and abrasion resistance. To alter these properties, cross-linking methods utilizing chemical reactions (e.g., thermoset or vulcanized rubber), x-rays, or electron beams, have been employed for some time. Recently, superior improvements in surface mechanical properties have been achieved by implantation of energetic light ions into polymers. In ion implantation, ions are accelerated and extracted from an external source and injected into the surface of a target polymer. Implantation results in modified molecular structures (e.g., 3-dimensional crosslinking) and compositional changes (e.g., hydrogen depletion). Dramatic increases in hardness of up to 44 times, increases in electrical conductivity of up to 10 orders of magnitude, and improved gas permeability of up to 100 times, have been observed. These improvements have been achieved with light ions with energies of order 0.1–1 MeV, and implanted doses of order $10^{15}$ ions/cm$^2$. In contrast to electrons or photons, energetic ions are desirable since they produce sufficient linear energy transfer (LET) into electronic stopping $(dE/dx)_{el}$, which is large enough to result in significant cross-linking within the polymer. During implantation, adjacent hydrogen-carbon bonds in polymer chains are broken by the ion LET. The hydrogen recombines into a gas, eventually diffusing out of the polymer. Free carbon radicals located on adjacent polymer chains subsequently combine to form new C—C bonds, resulting in carbon rich, highly cross-linked polymer chains. To break adjacent C—H bonds, one requires an electronic LET $$\left.\frac{dE}{dx}\right|_{el} \geq \frac{a\varepsilon}{\delta}$$

where $\varepsilon$ is the binding energy (about 4 eV), $\delta$ is the interatomic spacing, which for many polymers is of the order of about 1 Å, and a is a numerical factor, greater than unity, which accounts for other reactions with polymer electrons which lead to ion slowdown but do not result in the breaking of C—H bonds. Assuming a is about 3, one needs $(dE/dX)_{el}$ of 12 eV/Å or more.

A fundamental limitation to the ion implantation process is that since the ions are injected from an external source, only an outer surface of the polymer, corresponding to the projected ion range, $R_p$ (typically $\leq 10$ μm, for most ions with energies below 1 MeV), can be treated. In many applications, deeper modified layers are desirable, especially for wear applications where plastic deformation of the soft substrate severely restricts the effectiveness of the much harder ion-implanted surface.

It is an object of the present invention to provide a process of treating polymers with neutron capture induced radiation.

It is a further object of the invention to provide precursor compositions for treatment by neutron capture induced radiation.

Still further, it is an object of the present invention to provide the altered polymeric products of neutron capture induced radiation.

SUMMARY OF THE INVENTION

To achieve the foregoing and other objects, and in accordance with the purposes of the present invention, as embodied and broadly described herein, the present invention provides a precursor composition adapted for neutron capture induced radiation treatment of said precursor composition including a polymer matrix containing dispersed dopant material, said dispersed dopant material characterized as capable of neutron capture whereupon subsequent in situ energetic ion irradiation of said polymer matrix can occur, and further characterized as dispersed so as to provide dopant domain sizes significantly less than the energetic ion range of the dopant material.

The present invention further provides a process of in situ irradiation of bulk polymeric articles including providing a precursor composition adapted for neutron capture induced radiation treatment of said precursor composition including a polymer matrix containing dispersed dopant material, said dispersed dopant material characterized as dispersed so as to provide dopant domain sizes significantly less than the energetic ion range of the dopant material, and, exposing said precursor composition to a source of neutrons.

DETAILED DESCRIPTION

The present invention is concerned with neutron capture induced radiation treatment of polymer materials.

Figure 1:
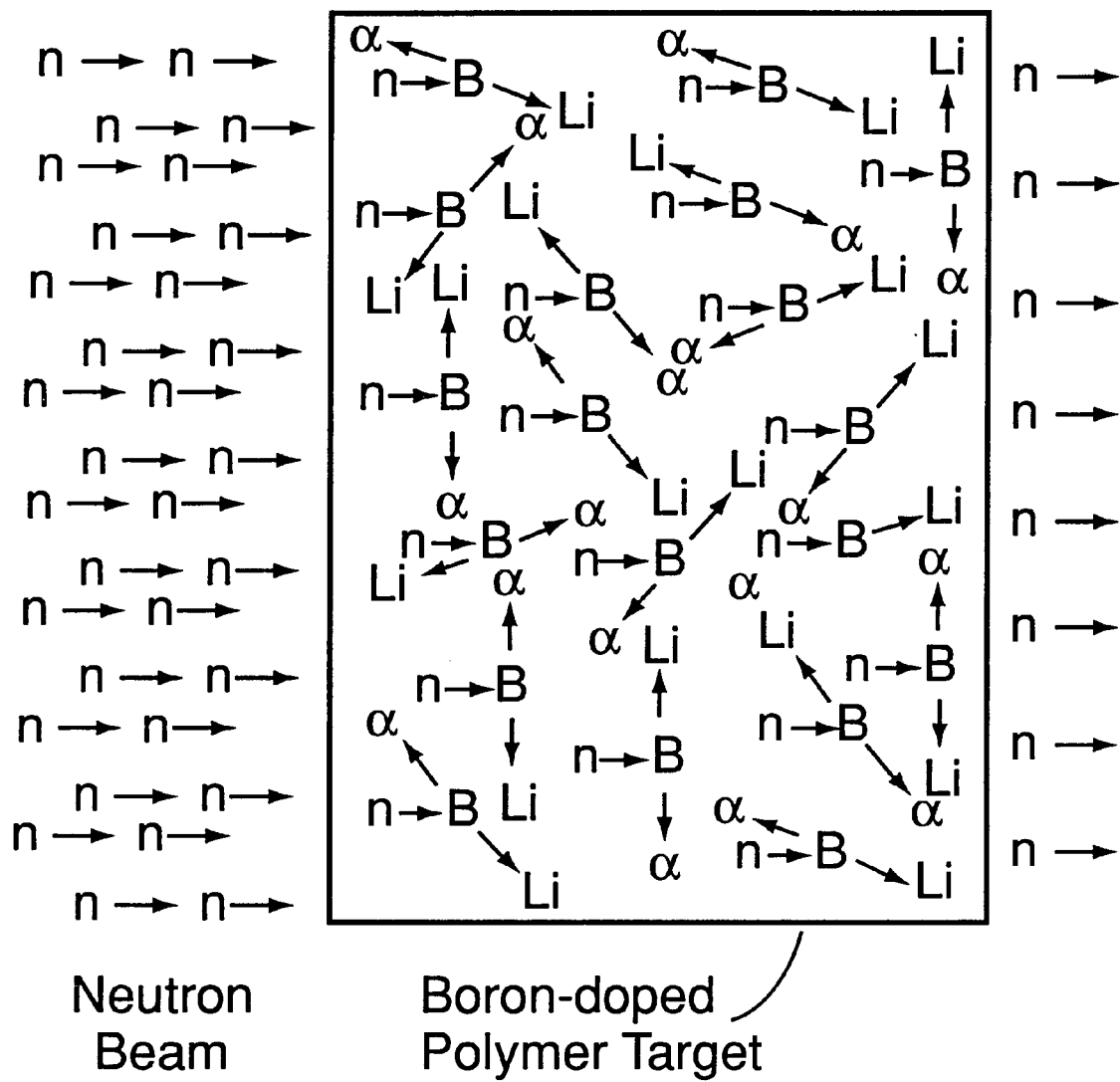
FIG. 1 is a schematic view of the neutron capture induced radiation treatment method of the present invention.

In order to extend the known benefits of energetic ion implantation to bulk material properties rather than only surfaces, neutron capture induced polymer treatment, as illustrated in FIG. 1, is used. Neutrons from an external source are injected into a polymer material. Neutrons readily penetrate the polymer and interact with target atoms that reside inside the polymer. Target atoms may be the constituent atoms that make up the polymer, or they may be dopants, such as boron, which are introduced into the polymer prior to the neutron treatment. Modification of the chemical and physical properties of the polymer occur from radiation damage caused by the slowdown and stopping of energetic light ions that are produced by the disintegration of target atoms after they capture a neutron. A particular appealing reaction is n+$^{10}$B→$^4$He+$^7$Li which results in an energy release of 2.79 MeV. In 93% of the reactions, the $^7$Li nucleus is created in an excited state which relaxes through the emission of a 0.48 MeV γ-ray. The remaining 2.31 MeV is in the form of kinetic energy shared between a 1.46 MeV alpha particle and a 0.85 MeV $^7$Li recoil nucleus. The other 7% of the reactions result in ground state $^7$Li, with all 2.79 MeV being transferred into a 1.78 MeV $^4$He and a 1.01 MeV $^7$Li kinetic energy. The principal reaction is attractive because of the high naturally-occurring concentration (20%) of the $^{10}$B isotope and the reaction's high probability, with a cross section $\sigma=3.8\times10^{-25}$ m$^2$ for thermal neutrons. The energetic $^4$He and $^7$Li particles are ionized as they move through the polymer and are rapidly slowed down and stopped, primarily by electronic and nuclear stopping inside the polymer. The maximum electronic LET, which has been computed with the TRIM code (described by Ziegler et al. in The Stopping and Range of Ions in Solids, Pergamon Press, New York, 1985 and such description incorporated herein by reference), is between 20 and 30 eV/Å which appears well suited to this application, with projected ranges of about 3 to 8 $\mu$m.

The neutron capture method results in the injection of the requisite MeV ions from inside of the target. In contrast to the conventional ion implantation process, this neutron capture process results in the treatment of bulk materials rather than just surfaces, since neutrons readily penetrate thick samples, allowing the formation of energetic disintegration products throughout the polymer.

An estimation of the requisite neutron dose can be accomplished, where $\phi_n = \int Y_n dt$ (where $Y_n$ is the neutron flux), and with $^{10}$B atomic density $n_B$, by extrapolation with the ion implantation parameters of Lee et al., Nucl. Instrum. Meth. Phys. Res., v. B74, p. 326 (1993). The total number of neutron capture reactions per unit volume n is given by $n = \int n_B(t) <Y_n\sigma> dt$. An ion fluence of $5\times10^{19}$ m$^{-2}$ implanted into a 5 $\mu$m depth is equivalent to $n=10^{24}$ m$^{-3}$, where both $^4$He+$^7$Li nuclei are assumed to cause cross linking. For $n_B=10^{26}$ m$^{-3}$ (1% $^{10}$B concentration) doped into polystyrene (50% C, 50% H, specific gravity=1.06), and thermal neutrons, $\phi_n$ is $5\times10^{-21}$ m$^{-2}$, where the thin-target exposure time is about 1.5 hours in a $Y_n=10^{18}$/m$^2$/s reactor beam.

In addition to the intended n,$\alpha$ reaction, radiation damage from other sources and reactions may be considered. Gamma and neutron radiation effects on polymers are well known. Polymers with a tendency to cross link harden slightly with gamma radiation before degradation and destruction at doses of 0.1 to 4 Grad. For thick targets, the 0.48 MeV $\gamma$ from the $^7$Li product will result in a dose D of approximately 8 Grad for $n=10^{24}$ m$^{-3}$. D will be considerably smaller for thin targets with thicknesses less than the $\gamma$ absorption range (about 0.1 meter for polymers) since a significant portion of the $\gamma$'s can escape from the target. While thermal neutrons tend not to deposit significant energy into a polymer, accompanying epithermal and fast neutrons and gamma rays can. For example, in a reactor, approximately 1 rad of radiation from gammas and fast neutrons is deposited into a polymer per $10^{13}$ m$^{-2}$ of thermal neutron fluence. Thus, for $\phi_n$ is $5\times10^{21}$ m$^{-2}$, this dose is about 0.5 Grad, which is well below the damage theshold for polystyrene.

The details of neutron transport and absorption have been modeled using the Monte Carlo Neutron Photon (MCNP) code (see MCNP—A General Monte Carlo N-Particle Transport Code, Ver. 4A, Briesmeister, ed., Los Alamos National Laboratory Report LA-12625 (1993), available from the National Technical Information Center, 5285 Port Royal Rd., Springfield, Va., 22161, such description incorporated herein by reference). MCNP simulates neutron transport, one particle history at a time in sequence, into three-dimensional targets using a fully probabilistic, Monte Carlo method with self-consistent reaction cross sections. The uncertainty of the simulation stems primarily from the accuracy of the cross section data, the statistics of the particle histories, and the details of the target material composition and geometry. For a well-known target geometry and a sufficient number of particles, the uncertainty is typically better than 1%.

Simulations have been performed for a neutron flux at normal incidence onto a surface of a 100×100×100 millimeter (mm) polystyrene cube. $^{10}$B concentrations relative to hydrogen $n_B/n_H$ of 0, 0.01% and 1% were modeled. For the modeling, the target was irradiated with a "beam" (FIG. 1) of $10^5$ neutrons having a Maxwellian energy distribution with a temperature of 0.025 eV. In addition to the desired $^{10}$B(n,$\alpha$)$^7$Li reaction, other principal reactions were elastic scattering (mostly from the protons in the polymer) and the H(n,$\gamma$)D reaction which releases a 2.2 MeV $\gamma$-ray and has a cross section of approximately 0.3 barn for thermal neutrons, a value $10^4$-times smaller than for the $^{10}$B reaction. MCNP tallies of the $^{10}$B(n,$\alpha$)$^7$Li and H(n,$\gamma$)D reaction rates were computed in 10 volumes, evenly spaced into the target beginning from the front surface and averaged over the 100×100 mm lateral area. In addition, surface flux tallies were performed over the sides of the cube target to estimate lateral loss from elastic scattering.

Figure 2:
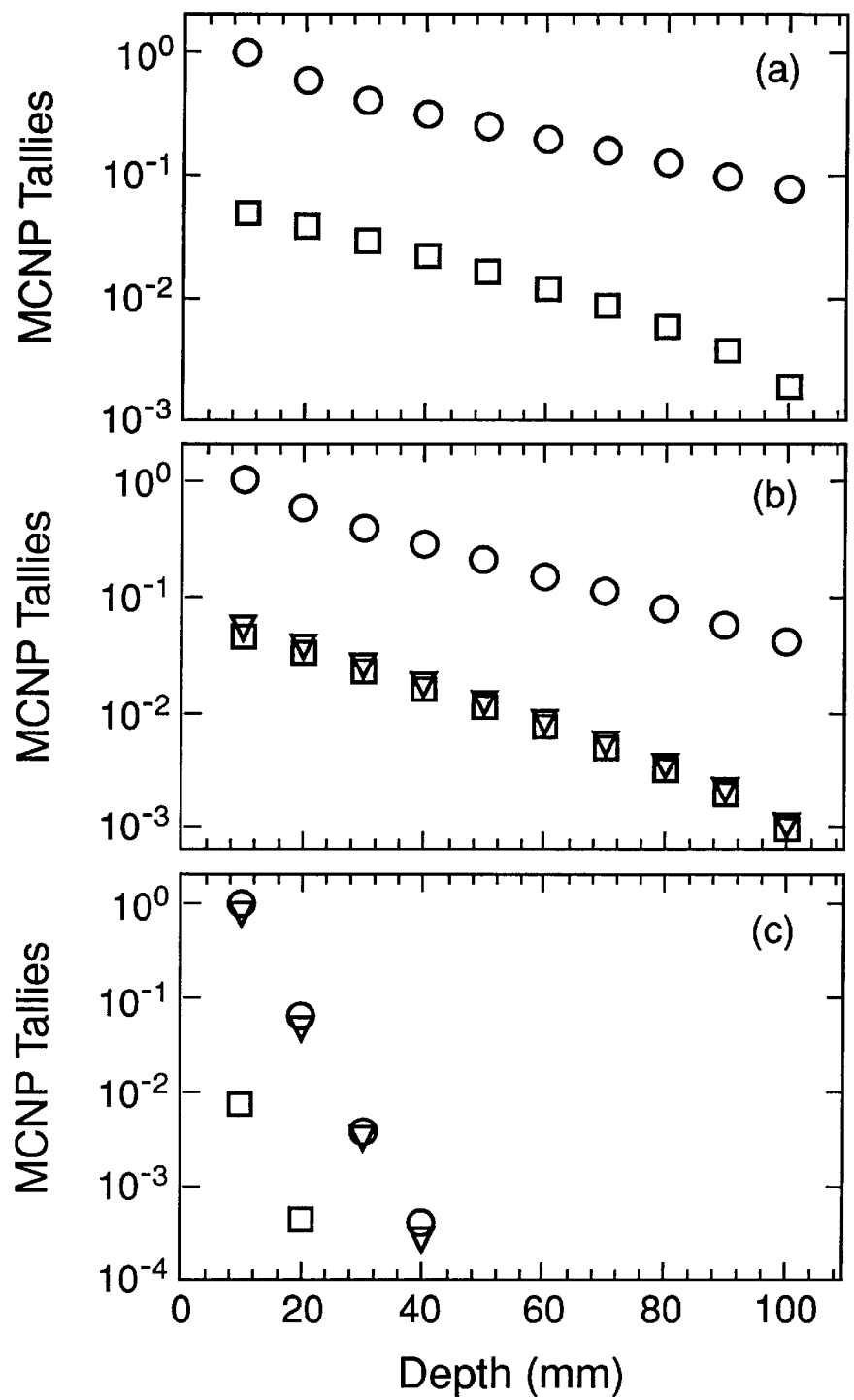
FIGS. 2(a), 2(b), and 2(c) show graphical plots of Monte Carlo simulations of thermal neutron transport and absoption with the MCNP code for thermal neutrons injected into a 100×100×100-millimeter thick polystyrene cube with $^{10}$B molar concentrations of: (a) 0; (b) 0.01 percent; and, (c) 1 percent. Symbols are as follows: ○ is relative neutron flux; □ is average H(n,γ)D reaction rate per 10 millimeters; and, ▽ is average $^{10}$B(n,α)$^7$Li reaction rate per 10 millimeters.

MCNP tallies of the relative neutron population and the absorption reaction rates are plotted in FIGS. 2(a) and 2(b). For the undoped target (FIG. 2(a)), elastic scattering is an important effect since the mean-free path for elastic scattering (the dominant reaction), $\lambda_{el}=1/n_H\sigma_{el}\approx 8$ mm (where $n_H$ is the atomic density of hydrogen in the polymer and $\sigma_{el}$ is the elastic scattering cross section), which is significantly smaller than the 100 mm target thickness. Consequently, neutrons diffuse through the cube and also out the sides, leading to an attenuation of the neutron population. For undoped targets, the flux lost through the lateral surfaces accounts for most of the 93% attenuation in flux, with the H(n,$\gamma$)D reaction being responsible for only about 4%. For 0.01% $n_B/n_H$ concentration, increased attenuation is observed due to the $^{10}$B(n,$\alpha$)$^7$Li reaction, which has become comparable to the H(n,$\gamma$)D reaction, and results in an increased neutron attenuation of approximately 4%. At 1% concentrations, the $^{10}$B(n,$\alpha$)$^7$Li reaction dominates, capturing most of the neutrons with a reaction mean free path $1/n_B\sigma$ of about 5 mm.

For doped polymers, dopant atoms must be evenly dispersed within the 3 to 8 $\mu$m ranges of the $^7$Li and $^4$He ions, respectively. For effective ion energy transfer into the polymer, dopant domain sizes need to be significantly smaller than the ion range, $R_p$, in the dopant phase. Boron-doped polyethylene is routinely used for neutron shielding. However, for these materials, boron is often concentrated in, or agglomerates into, relatively large domains with sizes easily exceeding $R_p$. Ideally, atomic dispersion is desirable. Assuming the 20% natural concentration of $^{10}$B, between 1% and 10% (molar) total boron concentrations (relative to the polymer repeat unit) should be adequate to result in the required dose.

In order to incorporate boron into a polymer in a well dispersed fashion, a number of approaches may be suitable. For example, dissolving polystyrene and a boron compound together followed by casting has been found to give a boron doped polymer film. In particular, this physical mixing method will be useful for polymers containing atoms which can form good Lewis acid-base pairs with boron. Polymers containing Lewis bases such as amines, ether, amide or phosphine groups (e.g., polyester, polyacrylamide, and amide) may also be suitable. A related method is to chemically treat a polymer containing groups such as hydroxyl groups (such as polyvinylalcohol) with a boron precursor compound to give a polymer containing boron covalently bonded to the polymer backbone. Another approach is to incorporate boron in the polymer through copolymerization of a boron compound (e.g., boron allyloxide) with a monomer such as styrene. Depending on the physical properties, these materials could be formed into a given shape using standard polymer processing techniques. These methods of processing include techniques such as compression molding or injection molding of the copolymer or mixture into a shaped part.

In conclusion, a new treatment technique for the modification of polymeric materials has been described. The technique builds on the known benefits of ion implantation, but it enables the treatment of bulk materials rather than just surfaces. While this description deals with only one example, the $^{10}B(n,\alpha)^{7}Li$ reaction, the basic idea of neutron capture, and also, neutron-induced recoil, of other atoms residing within polymers should result in similar radiation damage that may alter compositional, mechanical, electrical, optical, and gas diffusion properties of a material.

Although the present invention has been described with reference to specific details, it is not intended that such details should be regarded as limitations upon the scope of the invention, except as and to the extent that they are included in the accompanying claims.

What is claimed is:

1. A precursor composition adapted for neutron capture induced radiation treatment of said precursor composition comprising a bulk polymer matrix with size dimensions of at least 100 millimeters containing dispersed dopant material, said dispersed dopant material characterized as capable of neutron capture whereupon subsequent in situ energetic ion irradiation of said polymer matrix can occur thereby altering bulk polymeric properties of said polymer matrix, and further characterized as dispersed so as to provide dopant domain sizes significantly less than the energetic ion range of the dopant material.

2. The composition of claim 1 wherein said dispersed dopant material is boron and said energetic ion range is from about 3 µm to 8 µm.

3. The composition of claim 1 wherein said polymer matrix is of a polymer containing Lewis base groups.

4. A process of in situ energetic ion irradiation of bulk polymeric articles with size dimensions of at least 100 millimeters comprising:

providing a precursor composition adapted for neutron capture induced radiation treatment of said precursor composition including a bulk polymer matrix with size dimensions of at least 100 millimeters containing dispersed dopant material, said dispersed dopant material characterized as dispersed so as to provide dopant domain sizes significantly less than the energetic ion range of the dopant material; and, exposing said precursor composition to a source of neutrons whereby said polymer matrix undergoes alteration of bulk polymeric properties.

5. The process of claim 4 wherein said dispersed dopant material is boron.

6. The polymer composition of claim 1 wherein said polymer matrix is of a polymer including Lewis bases selected from the group consisting of amines, ethers, amides and phosphines.

7. The process of claim 4 wherein said polymer matrix is of a polymer including Lewis bases selected from the group consisting of amines, ethers, amides and phosphines.

* * * * *